(12) United States Patent
Taberner

(10) Patent No.: US 9,651,193 B1
(45) Date of Patent: May 16, 2017

(54) SECURITY MOUNTING ARRANGEMENT

(71) Applicant: Ian Taberner, Springbrook (CA)

(72) Inventor: Ian Taberner, Springbrook (CA)

( * ) Notice: Subject to any disclaimer, the term of this patent is extended or adjusted under 35 U.S.C. 154(b) by 0 days.

(21) Appl. No.: 14/948,185

(22) Filed: Nov. 20, 2015

(51) Int. Cl.
| *F16M 13/00* | (2006.01) |
| *F16M 13/02* | (2006.01) |
| *F16B 41/00* | (2006.01) |
| *B60Q 1/26* | (2006.01) |
| *B60Q 1/02* | (2006.01) |
| *B60R 11/02* | (2006.01) |
| *B60R 11/00* | (2006.01) |

(52) U.S. Cl.
CPC .............. *F16M 13/02* (2013.01); *B60Q 1/02* (2013.01); *B60Q 1/2615* (2013.01); *B60R 11/0217* (2013.01); *F16B 41/005* (2013.01); B60R 2011/0096 (2013.01)

(58) Field of Classification Search
CPC ..... F16M 13/02; F16B 41/005; B60Q 1/2615; B60Q 1/02; B60R 11/0217
See application file for complete search history.

(56) References Cited

U.S. PATENT DOCUMENTS

| 976,569 | A | * | 11/1910 | Horrocks | ................ F16B 33/02 411/366.1 |
| 2,069,500 | A | | 2/1937 | McGarry | |
| 3,410,122 | A | | 11/1968 | Moses | |
| 3,822,049 | A | | 7/1974 | Saunders | |
| 4,024,737 | A | | 5/1977 | McInturff | |
| 4,103,982 | A | | 8/1978 | Rudd | |
| 4,117,700 | A | | 10/1978 | Saunders | |
| 4,495,787 | A | | 1/1985 | Comstock | |
| 4,582,290 | A | | 4/1986 | Baron | |
| 4,791,535 | A | | 12/1988 | Sclafani et al. | |
| 5,904,383 | A | | 5/1999 | Van Der Wal | |
| 5,988,966 | A | | 11/1999 | Chen et al. | |
| 2002/0162932 | A1 | | 11/2002 | Poorman | |
| 2005/0002756 | A1 | | 1/2005 | Oleszek | |
| 2011/0027044 | A1 | | 2/2011 | Dillenberger | |
| 2014/0346299 | A1 | | 11/2014 | Sterling | |

FOREIGN PATENT DOCUMENTS

| CA | 2436350 A1 | 1/2005 |
| CN | 2063909 U | 3/1990 |
| CN | 2179486 Y | 11/1993 |
| CN | 200978872 Y | 11/2007 |
| CN | 201344196 Y | 11/2009 |
| CN | 201763780 U | 3/2011 |
| CN | 102312901 A | 1/2012 |

(Continued)

*Primary Examiner* — Amy Sterling

(57) ABSTRACT

A security mounting arrangement can include a first fastening member, a second fastening member, a sleeve, and a third fastening member. The first fastening member can be a bolt. The second fastening member can be a nut threadingly engageable with the first fastening member. The sleeve can have an aperture configured to receive the second fastening member and a portion of the first fastening member. The third fastening member can be a bolt extendable through an aperture of the first fastening member and threadingly engageable with the inwardly-facing threads defined by the third fastening member. The third fastening member can have a security head.

20 Claims, 9 Drawing Sheets

(56) References Cited

FOREIGN PATENT DOCUMENTS

| | | |
|---|---|---|
| CN | 203713753 U | 7/2014 |
| EP | 0231218 A1 | 1/1987 |
| EP | 0519126 A1 | 12/1992 |
| JP | 2003343537 A | 12/2003 |
| JP | 2014015990 A | 1/2014 |
| JP | 2014159863 A | 9/2014 |

* cited by examiner

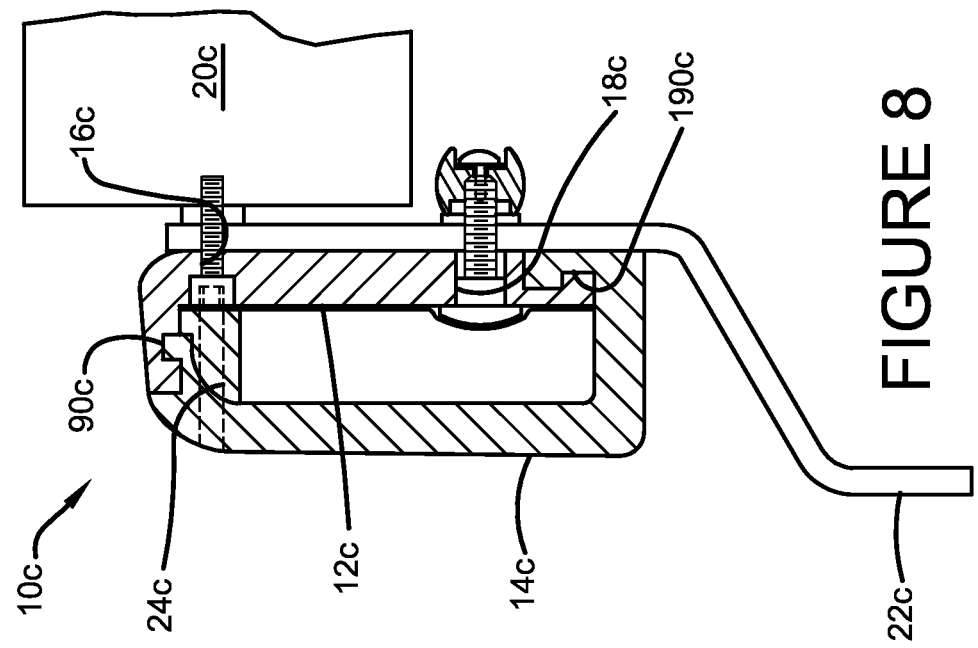
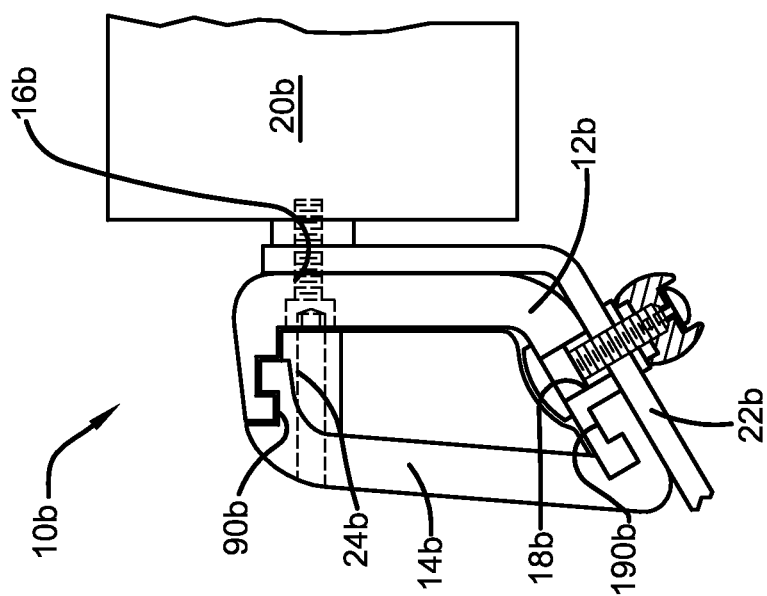

SECURITY MOUNTING ARRANGEMENT

BACKGROUND

1. Field

The present disclosure relates to mounting arrangement for mounting an accessory structure to a primary structure that inhibits theft of the accessory structure.

2. Description of Related Prior Art

U.S. Pat. No. 5,904,383 discloses an ANTI-THEFT BOLT GUARD. The anti-theft bolt guard is shown having a cylindrical body (65) for placing over a nut (60) of an installed bolt (30). Third washer (45) engages bolt (30) and the body (65) is affixed to the bolt (30) with a threaded circular guard nut (85). The guard nut (85) is tightened with a special key (120). A fourth washer (46) engages the guard nut (85) and an adhesive (57) material may be inserted. The guard nut (85) is then sealed off with the insertion of a press fit seal cover (95) thus providing a device that prevents easy access to the nut (60) and removal of the bolt (30). Protection for the exposed head (32) of a bolt can be obtained by inserting the bolt (30) through a head guard (35) where a press fit head cover (25) is inserted in the first end (36). An adhesive (57) can be inserted to increase the difficulty of removal of the protection device.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A security mounting arrangement can include a first fastening member, a second fastening member, a sleeve, and a third fastening member. The first fastening member can be a bolt having a security head, a shaft extending along a fastener axis from the security head and with outwardly-facing threads, and an aperture defined in the shaft and having inwardly-facing threads. The second fastening member can be a nut threadingly engageable with the outwardly-facing threads of the first fastening member and having a height defined along the fastener axis and a width defined transverse to the fastener axis. The sleeve can have an aperture configured to receive the second fastening member and the shaft. The aperture of the sleeve can have a first portion and a second portion and a third portion. The first portion can have a first height defined along the fastener axis and a first diameter sized to receive the second fastening member. The second portion can have a second height defined along the fastener axis and a second diameter defined transverse to the fastener axis. The second diameter can be less than the first diameter and can be positioned adjacent to the first portion along the fastener axis. The third portion can have a third height defined along the fastener axis and a third diameter defined transverse to the fastener axis. The third diameter can be greater than the second diameter and can be positioned spaced from the first portion along the fastener axis. The third fastening member can be a bolt extendable through the aperture of the first fastening member and threadingly engageable with the inwardly-facing threads. The third fastening member can have a shaft and a security head having a height defined along the fastener axis and a width defined transverse to the fastener axis. The width of the third fastening member can be greater than the second diameter and less than the third diameter.

BRIEF DESCRIPTION OF THE DRAWINGS

The detailed description set forth below references the following drawings:

FIG. 7 is a cross-section through another exemplary embodiment of the present disclosure;

FIG. 8 is a cross-section through another exemplary embodiment of the present disclosure.

DETAILED DESCRIPTION

Figure 1:
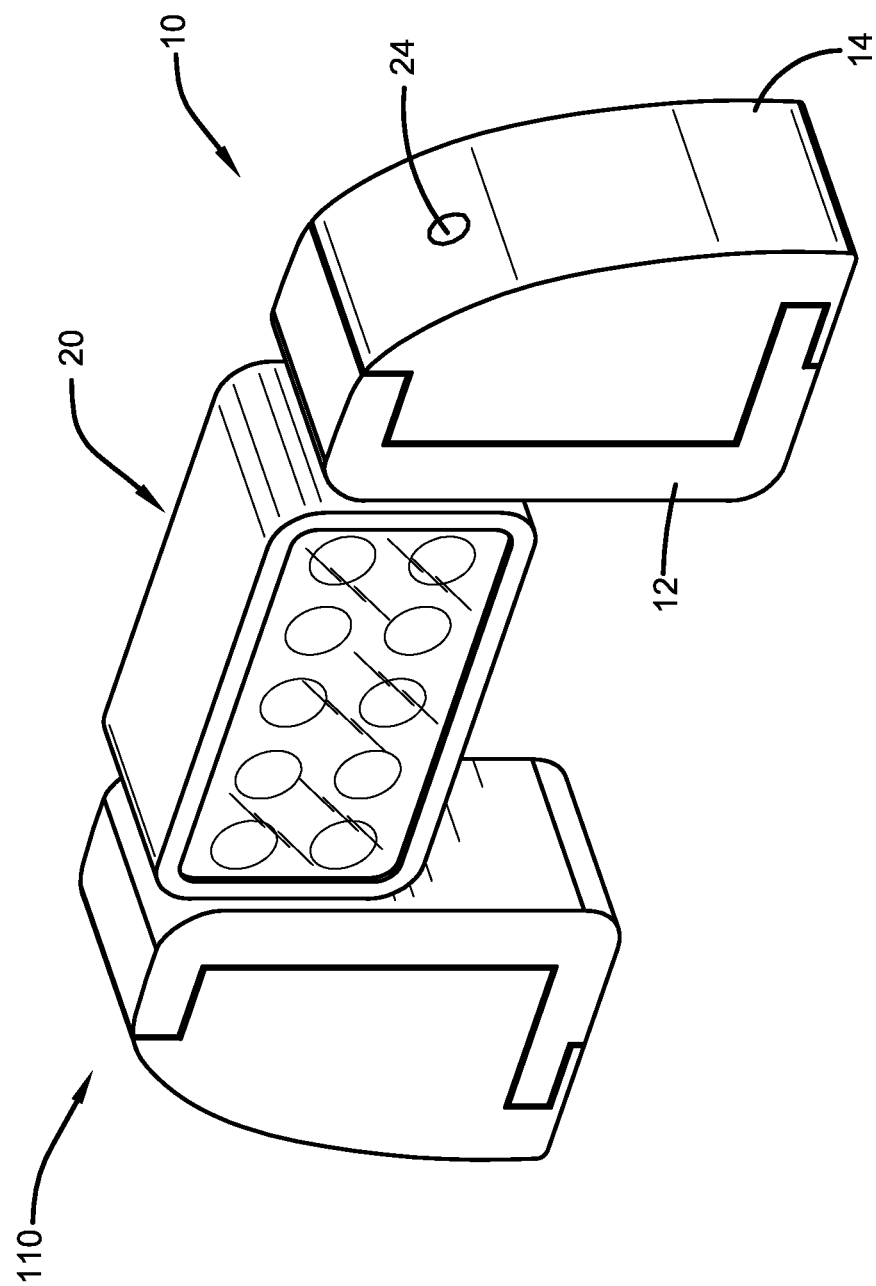
FIG. 1 is a perspective view of a vehicle lighting assembly incorporating an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Similar features in a particular embodiment have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide a security mounting arrangement to prevent the theft of accessory structures from primary structures. By way of example and not limitation, a primary structure can be a vehicle. By way of example and not limitation, an accessory structure can be a light bar, a speaker, or any other hard-mounted items on vehicles or other related items.

A bracket arrangement 10 can include a mounting bracket 12 and a shielding bracket 14. The mounting bracket 12 can have a first aperture 16 and a second aperture 18 spaced from one another. The first aperture 16 can be configured to receive a fastener for interconnecting the mounting bracket 12 to an accessory structure. In the first exemplary operating environment of the present disclosure, the accessory structure can be a light bar 20. The second aperture 18 can be configured to receive another fastener for interconnecting the mounting bracket 12 to a primary structure. In the first exemplary operating environment of the present disclosure, the primary structure can be a vehicle (referenced at 22 in FIG. 3). In the first exemplary operating environment of the present disclosure, the bracket arrangement 10 and a second security mounting arrangement 110 are utilized to securely mount the light bar 20 to the vehicle 22. The exemplary arrangements 10, 110 are substantially identical.

The shielding bracket 14 can be selectively engageable with the mounting bracket 12 and have a third aperture 24 aligned with the first aperture 16 when the mounting bracket 12 and the shielding bracket 14 are engaged with one another. The security mounting arrangement can also include at least one tongue and groove arrangement operably disposed between the mounting bracket 12 and the shielding bracket 14. The mounting bracket 12 and the shielding bracket 14 can be interconnected to one another through the at least one tongue and groove arrangement. In the at least one tongue and groove arrangement, one of the mounting bracket 12 and the shielding bracket 14 includes one of a tongue and a groove and the other of the mounting bracket 12 and the shielding bracket 14 includes the other of the tongue and the groove, the mounting bracket 12 and the shielding bracket 14 further defined as engaged with one another by sliding the tongue into the groove.

Figure 2:
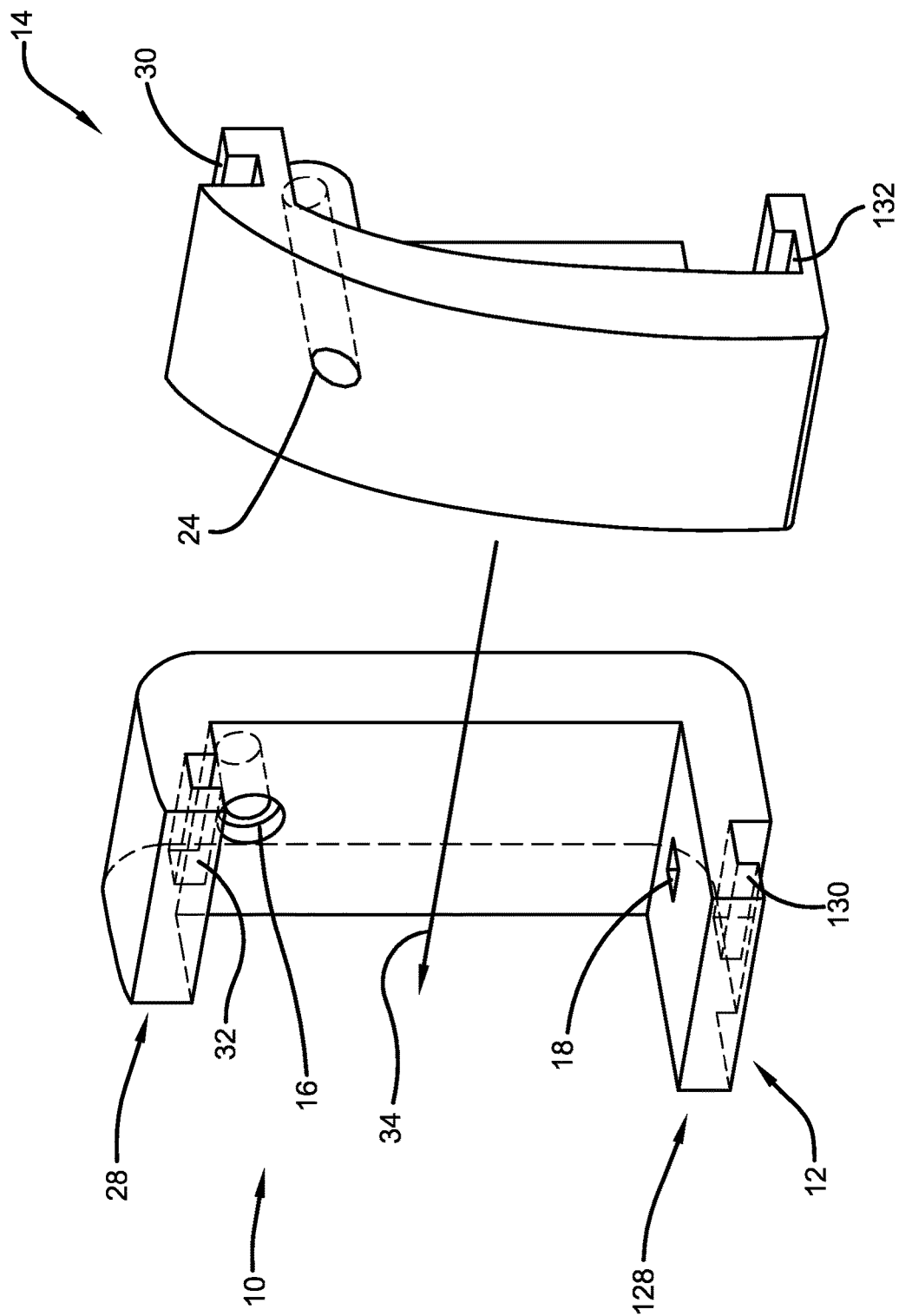
FIG. 2 is a perspective, partially exploded view of an exemplary security mounting arrangement.
Figure 3:
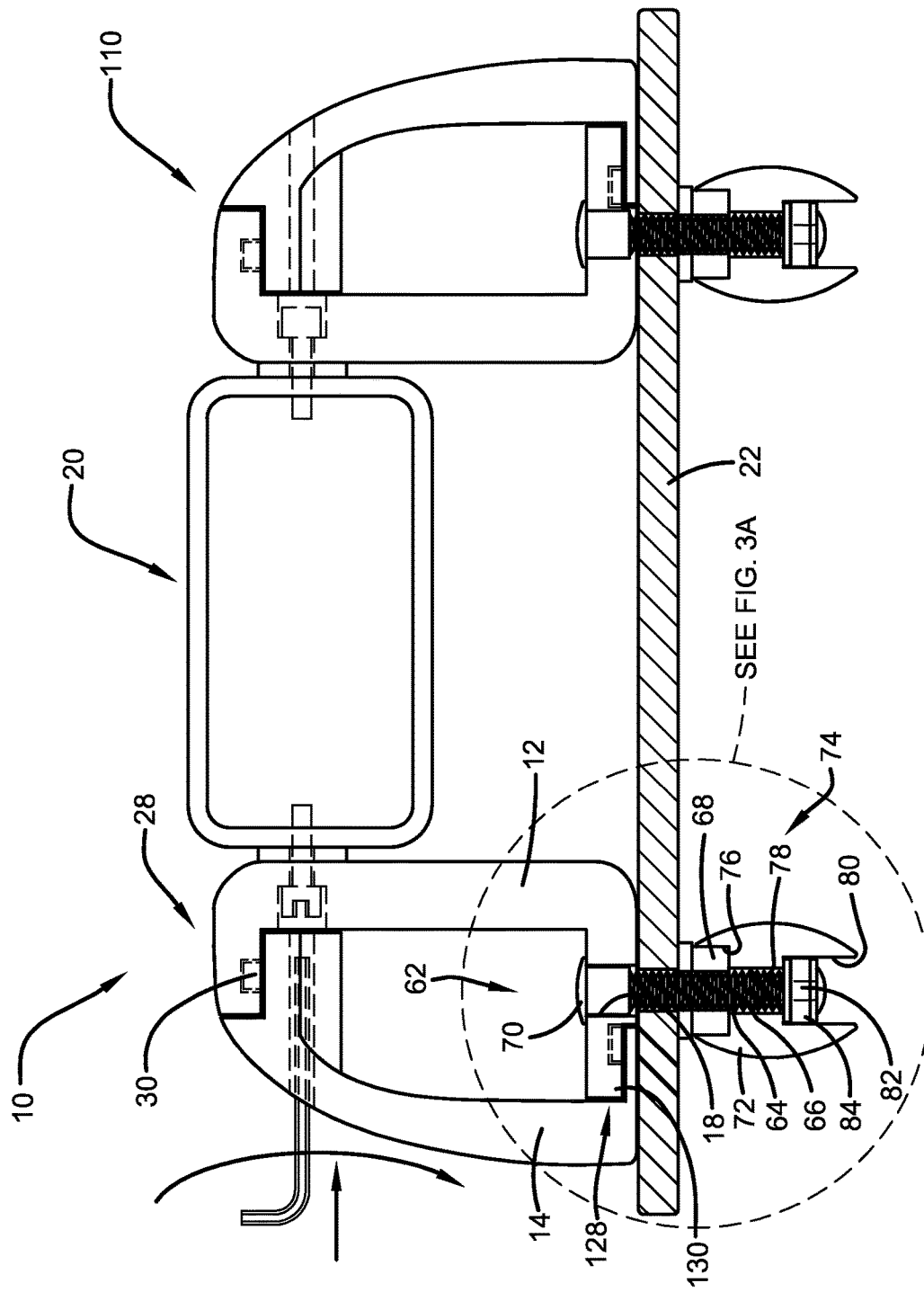
FIG. 3 is a rear view of the vehicle lighting assembly shown in FIG. 1 mounted on a primary structure such as a vehicle.
Figure 3A:
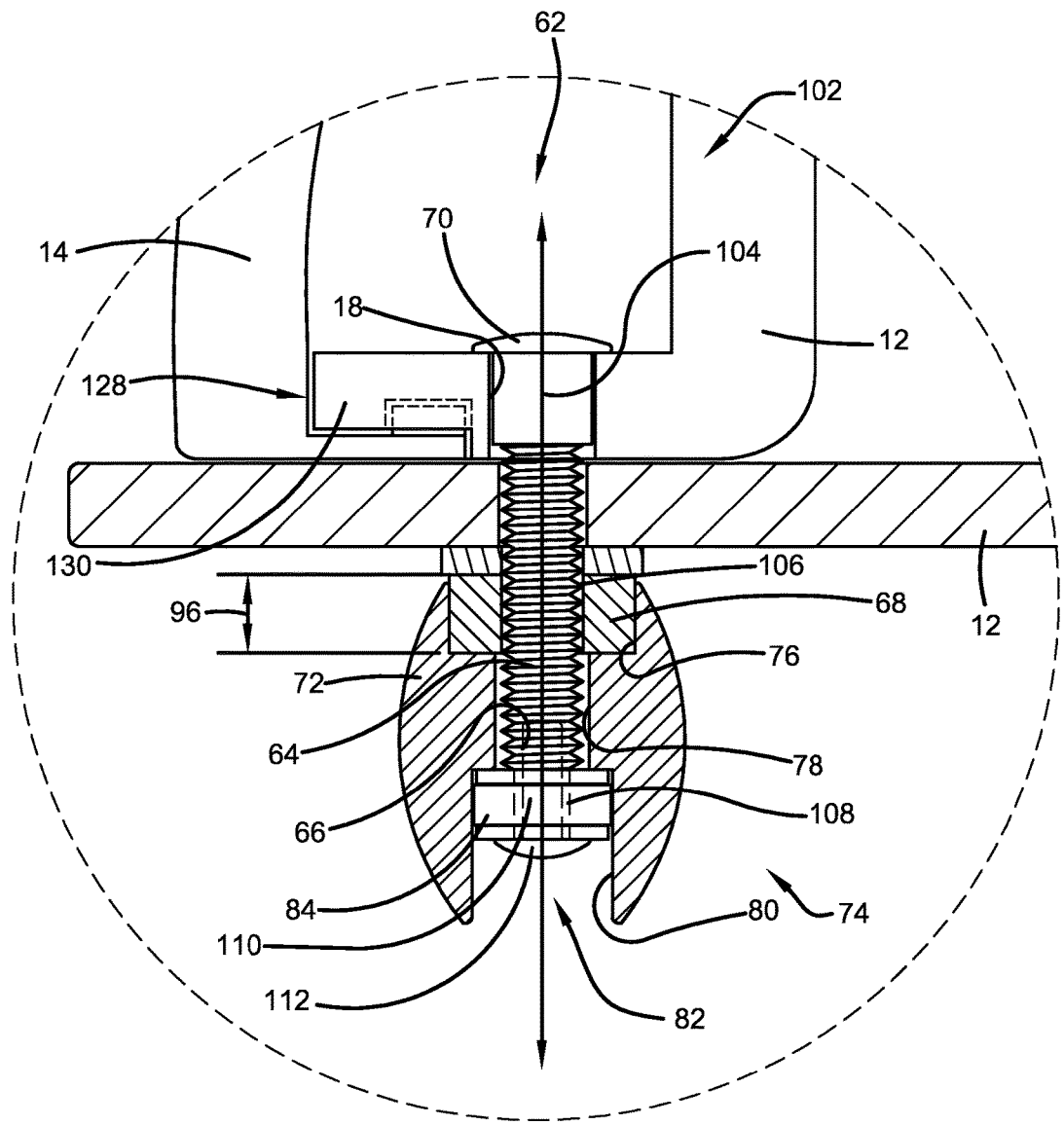
FIG. 3A is a magnified portion of FIG. 3.

In the first exemplary embodiment of the present disclosure, the at least one tongue and groove arrangement is further defined as a plurality of tongue and groove arrangements 28 and 128. As best shown in FIG. 3, the first tongue and groove arrangement 28 can be positioned proximate to the first aperture 16 and the second tongue and groove arrangement 128 positioned proximate to the second aperture 18. In the exemplary tongue and groove arrangement 28, the mounting bracket 12 includes a groove 32 (referenced in FIG. 2) and the shielding bracket 14 includes a tongue 30. In the exemplary tongue and groove arrangement 128, the mounting bracket 12 includes a groove 130 and the shielding bracket 14 includes a tongue 132. The mounting bracket 12 and the shielding bracket 14 can be engaged with one another by sliding the tongue 30 into the groove 32 and the tongue 132 into the groove 130. The direction of sliding movement is referenced by arrow 34.

Figure 4:
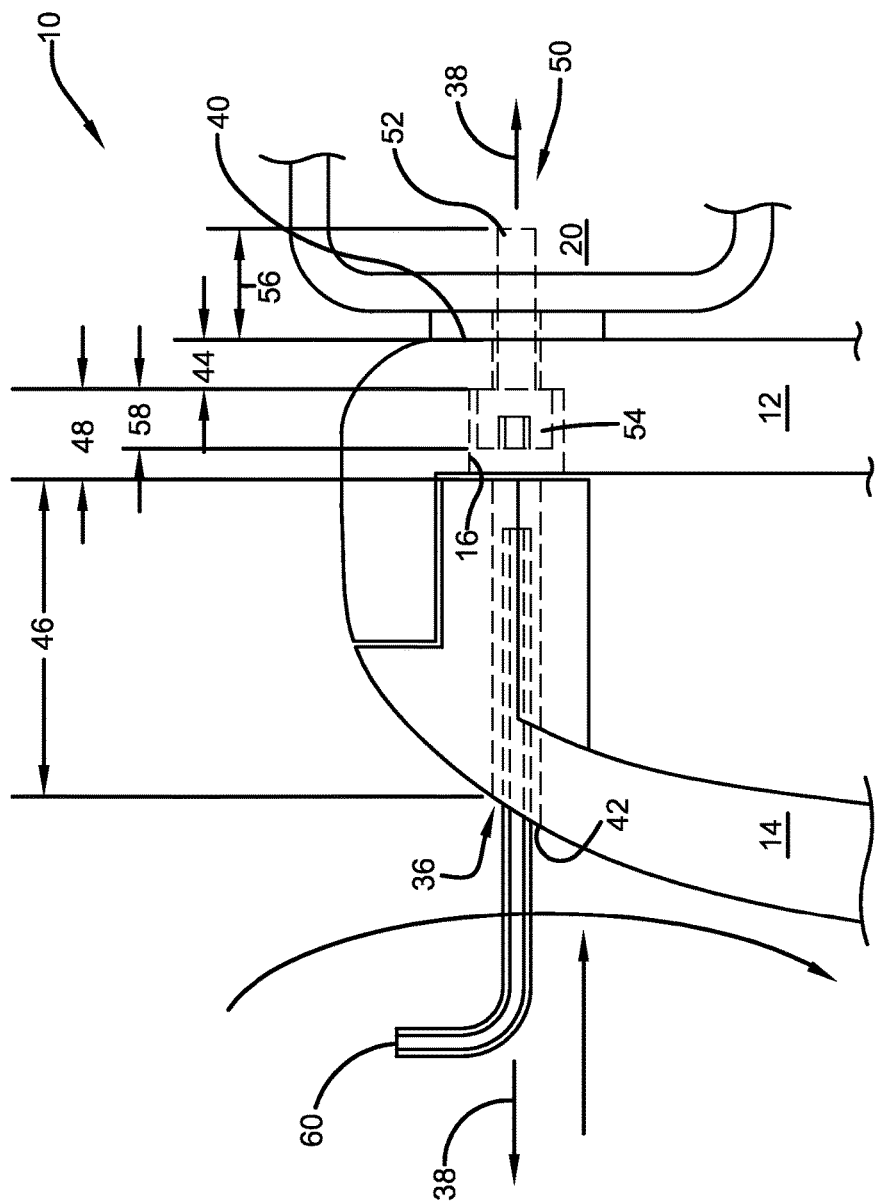
FIG. 4 is an enlarged portion of FIG. 3.

As best shown in FIG. 4, a passageway 36 extending along an axis 38 can be defined by the first aperture 16 and the third aperture 24 (referenced in FIG. 1). The first tongue and groove arrangement 28 and the second tongue and groove arrangement 128 can be positioned on opposite sides of the axis 38. The passageway 36 can extend through the mounting bracket 12 and the shielding bracket 14 when the mounting bracket 12 and the shielding bracket 14 are engaged with one another. The passageway 36 can extend between a first end 40 defined by the mounting bracket 12 and a second end 42 defined by the shielding bracket 14.

The passageway 36 can have a first portion 44 with a first diameter positioned proximate to the first end 40 of the passageway 36. The exemplary first portion 44 can be defined fully by the mounting bracket 12. The passageway 36 can also have a second portion 46 with a second diameter positioned proximate to the second end 42 of the passageway 36. The exemplary second portion 46 can be defined fully by the shielding bracket 14. The passageway 36 can also have a third portion 48 with a third diameter. The third position can be positioned between the first portion 44 and the second portion 46 along the axis 38. The third diameter can be greater than the first diameter and the second diameter. The exemplary third portion 48 can be defined fully by the mounting bracket 12.

The mounting bracket 12 and the shielding bracket 14 can abut one another when engaged with one another and close the passageway 36 between the first end 40 and the second end 42. The passageway 36 can define a through-hole between the first end 40 and the second end 42 when the mounting bracket 12 and the shielding bracket 14 are engaged with one another.

In an exemplary operation, a fastening member 50 can interconnect the mounting bracket 12 to the light bar 20. The fastening member 50 can include a shaft 52 with outwardly-facing threads. The shaft 50 can be extendable through the first aperture 16. The first portion 44 and the third portion 48 of the passageway 36 are defined by the first aperture. The fastening member 50 can also include a head 54 engaged with the shaft 52. The head 54 can have a larger diameter than the shaft 52 and a larger diameter than the first diameter of the first portion 44. The head 54 can be positioned in the third portion 48. The shaft 52 can protrude out of the first aperture 16 a first length 56. The head 54 can defines a height 58. The third portion 48 can extend along the axis 38 a second length (referenced also as 48). The first length 56 combined with the height 58 can be greater than the second length 48.

As a result, the fastening member 50 can be backed out of the first portion 44 of the passageway 36 to allow the light bar 20 to be rotatably adjusted relative to the bracket arrangement 10. A tool 60 can be inserted through the second portion 46 to engage the fastening member 50 for loosening the fastening member 50 and thereby allowing the light bar 20 to be rotatably adjusted relative to the bracket arrangement 10. However, first length 56 combined with the height 58 can be greater than the second length 48 so that the fastening member 50 cannot be fully disengaged from the light bar 20. Thus, the light bar 20 cannot be fully disengaged from the bracket arrangement 10. The fastening member 50 can be loosened (backed out of the first portion 44) until the head 54 abuts the shoulder defined between the second portion 46 and the third portion 48.

The mounting bracket 12 and the shielding bracket 14 can be formed from hardened steel to enhance the strength of the bracket arrangement 10 and inhibit unpermitted removal of the light bar 20.

The light bar 20 and bracket arrangement 10 can be mounted to the primary structure 22 with a security mounting arrangement 102 according to an embodiment of the present disclosure. The security mounting arrangement 102 can include a first fastening member 62. The first fastening member 62 can be a bolt having a security head 70 extendable through the second aperture 18. The first fastening member 62 can have a square cross-section that is positioned in aperture 18 to prevent turning. A security head provides an added level of security by preventing removal with ordinary screw drivers. A security head can have an indentation to receive a tool or can have a partially spherical head with no indentation. The first fastening member 62 can also include a shaft 64 extending along a fastener axis 104 from the security head 70 and with outwardly-facing threads. The exemplary first fastening member 62 can include first and second sets of outwardly-facing and differently-sized threads 106, 108. The first fastening member 62 can also include an aperture 66 defined in the shaft 64 and having inwardly-facing threads. The aperture 66 of the first fastening member 62 extends below both of the first and second sets of outwardly-facing threads 106, 108.

The security mounting arrangement 102 can also include a second fastening member 68 that can be a nut threadingly engageable with the outwardly-facing threads 106 of the first fastening member 62. The primary structure 22 and the mounting bracket 12 can be pressed between the second fastening member 68 and a head 70 of the first fastening member 62 when the light bar 20 and bracket arrangement 10 are mounted to the primary structure 22. The second fastening member 68 can having a height 96 defined along the fastener axis 104 and a width defined transverse to the fastener axis 104.

The security mounting arrangement 102 can also include a sleeve 72. The sleeve 72 can have an aperture 74 configured to receive the second fastening member 68. The sleeve 72 can have an outer arcuate surface in a plane containing the fastener axis 104. The outer surface can have a truncated egg shape, elliptical shape or sphere shape.

The aperture 74 can be configured to receive the second fastening member 68 and the shaft 64. The aperture 74 can have a first portion 76, a second portion 78, and a third portion 80. The first portion 76 can have a first height defined along the fastener axis 104 and a first diameter sized to receive the second fastening member 68. The second portion 78 can have a second height defined along the fastener axis 104 and a second diameter defined transverse to the fastener axis 104. The second diameter can be less than the first diameter. The second portion 78 can be positioned adjacent to the first portion 76 along the fastener axis 104. The third portion 80 can have a third height defined along the fastener axis 104 and a third diameter defined transverse to the fastener axis 104. The third diameter can be greater than the second diameter and can be positioned spaced from the first portion 76 along the fastener axis 104. The first set 106 of outwardly-facing threads can be positioned in the second portion 78 of the aperture of the sleeve 72 and the second set of outwardly-facing threads 108 can be positioned in the third portion 80 of the aperture of the sleeve 72.

The security mounting arrangement 102 can also include a third fastening member 82. The third fastening member 82 can be a bolt extendable through the aperture 74 and threadingly engageable with the inwardly-facing threads of the shaft 64. The third fastening member 82 can have a shaft 110 and a security head 112. The head 112 can have a height defined along the fastener axis 104 and a width defined transverse to the fastener axis 104. The width of the head 112 of the third fastening member 82 can be greater than the second diameter of the aperture 74 and less than the third diameter of the aperture 74. The height 96 of the second fastening member 68 can be fully or partially encircled by the sleeve 72 along the axis 104. The sleeve 72 can thereby prevent the second fastening member 68 from being turned or otherwise manipulated with a tool.

The security mounting arrangement 102 can also include a fourth fastening member 84. The fourth fastening member 84 can be in the form of a nut disposed between the head 112 of the third fastening member 82 and the second portion 78. The fourth fastening member 84 can have a height defined along the fastener axis 104 and a width defined transverse to the fastener axis 104. The fourth fastening member 84 can be threadingly engageable with the outwardly-facing threads of the third fastening member 82 or the threads 108 of the first fastening member 62. The width of the fourth fastening member 84 can be greater than the width of the security head 112 of the third fastening member 82 to expand the cross-sectional area of contact between the first fastening member 62 and the sleeve 72, enhancing the strength of the joint. The height of the fourth fastening member 84 in combination with the height of the security head 112 of the third fastening member 82 can be less than the third height. The third fastening member 82 can thus be threadingly engaged with the shaft 64 to fix the fastening member 84 which fixes the sleeve 72 in place over the second fastening member 68.

Figure 5:
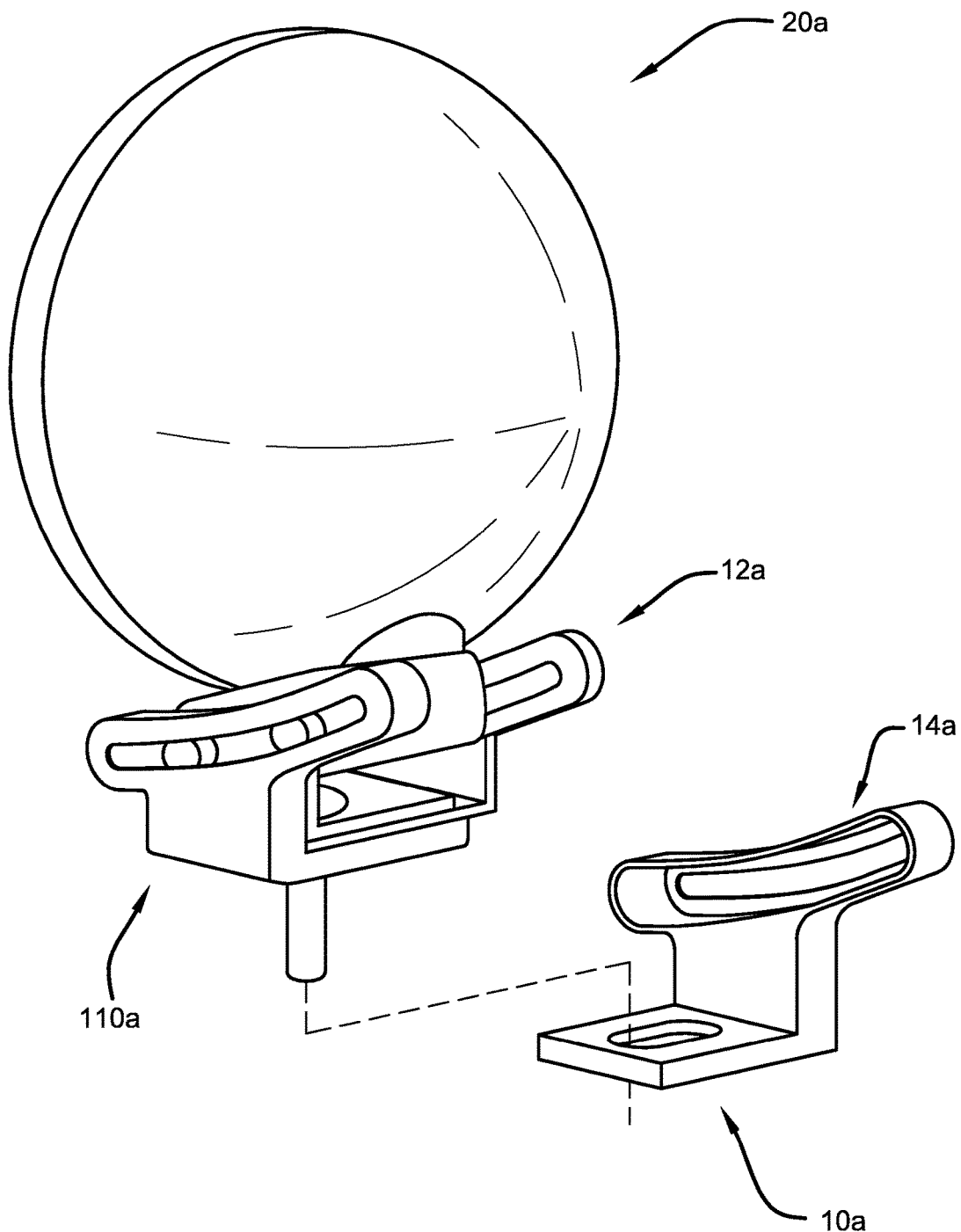
FIG. 5 is a perspective, partially exploded view of another vehicle lighting assembly incorporating an exemplary embodiment of the present disclosure.
Figure 6:
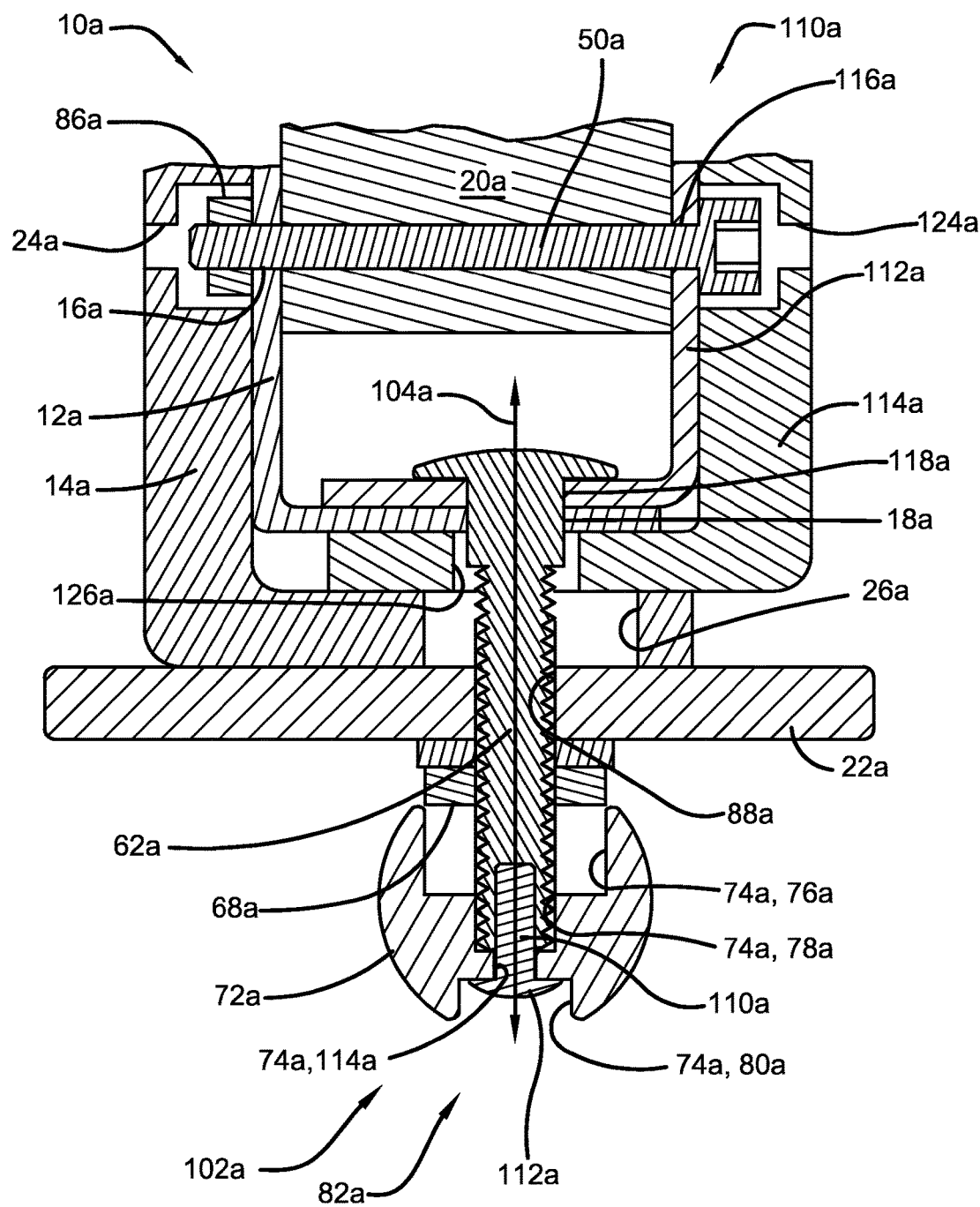
FIG. 6 is a cross-section through the vehicle lighting assembly shown in FIG. 5.

In another operating environment of the present disclosure, illustrated in FIGS. 5 and 6, a bracket arrangement 10a can include a mounting bracket 12a and a shielding bracket 14a. The mounting bracket 12a can have a first aperture 16a and a second aperture 18a spaced from one another. The first aperture 16a can be configured to receive a fastener 50a for interconnecting the mounting bracket 12a to an accessory structure. In the first exemplary operating environment of the present disclosure, the accessory structure can be a spotlight 20a. The second aperture 18a can be configured to receive another fastener 62a for interconnecting the mounting bracket 12a to a primary structure. In the second exemplary operating environment of the present disclosure, the bracket arrangement 10a and a second security mounting arrangement 110a are utilized to securely mount the spotlight 20a to a vehicle 22a. The exemplary arrangements 10a, 110a are substantially identical. The shielding bracket 14a can be selectively engageable with the mounting bracket 12a and have a third aperture 24a aligned with the first aperture 16a when the mounting bracket 12a and the shielding bracket 14a are engaged with one another. The shielding bracket 14a can also include a fourth aperture 26a aligned with the second aperture 18a when the mounting bracket 12a and the shielding bracket 14a are engaged with one another.

In an exemplary operation, the fastening member 50a can be directed through a first aperture 116a of a mounting bracket 112a. A shielding bracket 114a can be placed over the mounting bracket 112a such that an aperture 124a of the shielding bracket 114a is aligned with the first aperture 116a and that an aperture 126a of the shielding bracket 114a is aligned with a second aperture 118a of the mounting bracket 112a. The first fastening member 62a of a security mounting arrangement 102a can then be directed through the apertures 118a and 126a. The fastening member 50a can then be directed through an aperture in the spotlight 20a.

Another mounting bracket 12a can be then be assembled to the other structures by directing the fastening member 50a through a first aperture 16a of the mounting bracket 12a. A second aperture 18a can be slot and be directed to receive the first fastening member 62a.

A fastening member 86a can then be threadingly engaged with the fastening member 50a and tightened to secure the spotlight 20a to the mounting brackets 12a, 112a. A shielding bracket 14a can be placed over the mounting bracket 12a such that the aperture 24a of the shielding bracket 14a is aligned with the first aperture 16a and that an aperture 26a of the shielding bracket 14a is aligned with the first aperture 18a. The aperture 26a can be elongated to allow the bracket 14a to assemble to the other structures. At this point of assembly, the first fastening member 62a is directed through the apertures 118a, 18a, 126a, 26a. The first fastening member 62a can have a square cross-section that is positioned in apertures 118a, 18a to prevent turning. The assembly can then be mounted on a vehicle by directing first fastening member 62a through an aperture 88a in the primary structure 22a.

The security mounting arrangement 102a can also include a second fastening member 68a and a sleeve 72a. The sleeve 72a can have an aperture 74a configured to receive the second fastening member 68a. The aperture 74a can have a first portion 76a, a second portion 78a, a third portion 80a, and a fourth portion 114a. The first portion 76a can have a first height defined along a fastener axis 104a and a first diameter sized to receive the second fastening member 68a. The second portion 78a can have a second height defined along the fastener axis 104a and a second diameter defined transverse to the fastener axis 104a. The second diameter can be less than the first diameter. The second portion 78a can be positioned adjacent to the first portion 76a along the fastener axis 104a. The third portion 80a can have a third height defined along the fastener axis 104a and a third diameter defined transverse to the fastener axis 104a. The third diameter can be greater than the second diameter and can be positioned spaced from the first portion 76a along the fastener axis 104a.

The security mounting arrangement 102a can also include a third fastening member 82a. The third fastening member 82a can be a bolt extendable through the aperture 74a and threadingly engageable with the inwardly-facing threads of the first fastening member 62a. The third fastening member 82a can have a shaft 110a and a security head 112a. The head 112a can have a height defined along the fastener axis 104a and a width defined transverse to the fastener axis 104a. The width of the head 112a of the third fastening member 82a can be greater than the second diameter of the aperture 74a and less than the third diameter of the aperture 74a. The third fastening member 82a can thus be threadingly engaged with the first fastening member 62a to fix the sleeve 72a in place over the second fastening member 68a. The sleeve 72a can thereby prevent the second fastening member 68a from being turned or otherwise manipulated with a tool.

In another operating environment of the present disclosure, illustrated in FIG. 7, a bracket arrangement 10b can include a mounting bracket 12b and a shielding bracket 14b. The mounting bracket 12b can have a first aperture 16b and a second aperture 18b spaced from one another. The first aperture 16b can be configured to receive a fastener for interconnecting the mounting bracket 12b to an accessory structure 20b. The second aperture 18b can be configured to receive another fastener for interconnecting the mounting bracket 12b to a primary structure 22b. The shielding bracket 14b can be selectively engageable with the mounting bracket 12b and have a third aperture 24b aligned with the first aperture 16b when the mounting bracket 12b and the shielding bracket 14b are engaged with one another. In the third operating environment of the present disclosure, a passageway similar to passageway 36 is defined by the apertures 16b and 24b.

In contrast to the first operating environment, a third portion of the passageway in this operating environment (the portion in which the head of the fastening member is positioned) provides less space to back out the fastening member. Another difference is that tongue and groove arrangements of this operating environment include a first tongue and groove arrangement with a first groove having a first bottom surface 90b in a first plane and a second tongue and groove arrangement with a second groove having a second bottom surface 190b in a second plane, wherein the first plane is transverse to the second plane. Also, the first aperture 16b and the second aperture 18b are defined in different, transverse but non-perpendicular planes.

In another operating environment of the present disclosure, illustrated in FIG. 8, a bracket arrangement 10c can include a mounting bracket 12c and a shielding bracket 14c. The mounting bracket 12c can have a first aperture 16c and a second aperture 18c spaced from one another. The first aperture 16c can be configured to receive a fastener for interconnecting the mounting bracket 12c to an accessory structure 20c. The second aperture 18c can be configured to receive another fastener for interconnecting the mounting bracket 12c to a primary structure 22c. The shielding bracket 14c can be selectively engageable with the mounting bracket 12c and have a third aperture 24c aligned with the first aperture 16c when the mounting bracket 12c and the shielding bracket 14c are engaged with one another. In the third operating environment of the present disclosure, a passageway similar to passageway 36 is defined by the apertures 16c and 24c.

In contrast to the first operating environment, a third portion of the passageway in this operating environment (the portion in which the head of the fastening member is positioned) provides less space to back out the fastening member. Another difference is that tongue and groove arrangements of this operating environment include a first tongue and groove arrangement with a first groove having a first bottom surface 90c in a first plane and a second tongue and groove arrangement with a second groove having a second bottom surface 190c in a second plane, wherein the first plane is perpendicular to the second plane. Also, the first aperture 16c and the second aperture 18c are defined in coplanar or parallel planes and not perpendicular planes.

Figure 9:
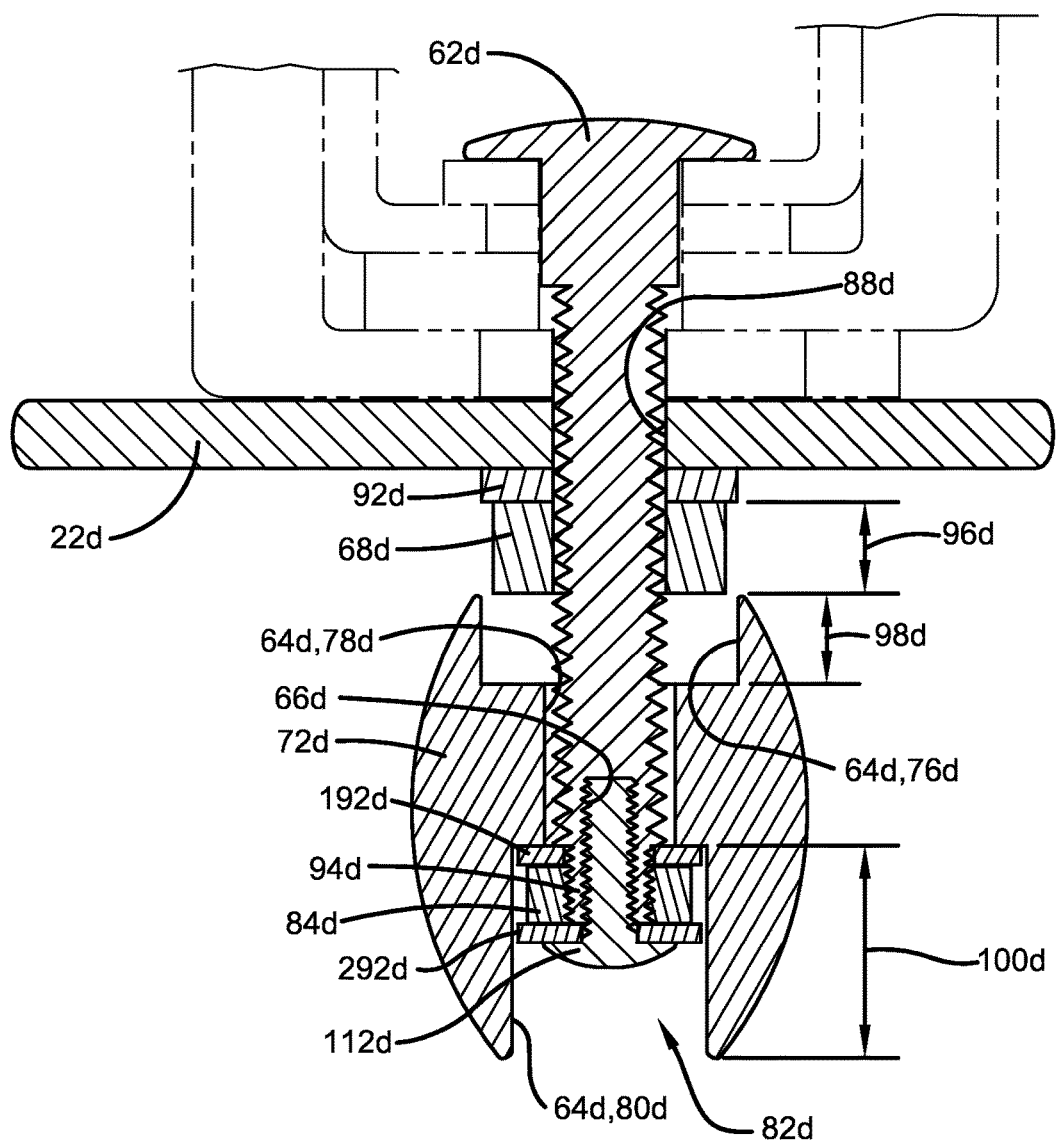
FIG. 9 is a cross-section through another part of the present disclosure.

Another embodiment of the present disclosure is illustrated in FIG. 9. An accessory (shown in phantom) and security mounting arrangement (shown in phantom) can be mounted to the primary structure 22d with a first fastening member 62d. The first fastening member 62d can be a bolt extendable through an aperture 88d. The first fastening member 62d can have a shaft with outwardly-facing threads and a fifth aperture 66d having inwardly-facing threads. Another second fastening member 68d can be a nut threadingly engageable with the outwardly-facing threads of the first fastening member 62d. The second fastening member 68d has height referenced at 96d. The primary structure 22d and the mounting bracket can be pressed between the second fastening member 68d and a head of the first fastening member 62d.

A sleeve 72d can have an aperture 74d configured to receive the second fastening member 68d and can have an outer arcuate surface. The outer surface can have a truncated egg shape or a truncated sphere. The aperture 74d can have a first portion 76d with a first diameter positioned proximate to the second fastening member 68d, a second portion 78d with a second diameter less than the first diameter and positioned proximate to the first portion 76d, and a third portion 80d with a third diameter greater than the second diameter and positioned adjacent the second portion 78d. The first portion 76d has height 98d. The height 98d can be selected so that the second fastening member 68d cannot be engaged with a tool when the second fastening member 68d is received a maximum amount in the first portion 76d. The third portion 80d has height 100d. The height 98d is less than the height 100d.

A third fastening member 82d can be a bolt extendable through the aperture 74d and threadingly engageable with the inwardly-facing threads of the first fastening member 62d. The third fastening member 82d can have a head with a diameter greater than the second diameter of the aperture 74d and less than the third diameter of the aperture 74d. The third fastening member 82d can thus be threadingly engaged with the first fastening member 62d to fix the sleeve 72d to the first fastening member 62d. A fourth fastening member 84d in the form of a nut can be disposed between the head of the third fastening member 82d and the second portion 78d to expand the cross-sectional area of contact between the first fastening member 62d and the sleeve 72d, enhancing the strength of the joint. Further, the fourth fastening member 84d can be threadingly engaged with the first fastening member 62d, on a smaller-diameter tip portion 94d of the first fastening member 62d having outwardly-facing threads. Various locking washers can also be utilized, and are referenced at 92d, 192d, and 292d.

In one exemplary approach to assembly, the washer 192d can be positioned to stop the sleeve 72d from removal, as its diameter is greater than the diameter of the second portion 78d. The fastening member 84d has a smaller diameter that the third portion 80d so that a socket can be fit between the fastening member 84d and the third portion 80d to tighten the fastening member 84d. The washer 292d can then be placed over the fastening member 84d and the fastening member 82d can be screwed into the aperture 66d, closing off the space between the fastening member 84d and the third portion 80d to prevent the socket from be inserted in order to loosen the fastening member 84d. The indentation of the security head 112d can be filled in with a metal epoxy to stop its removal.

In operation, the fastening member 68d can be exposed to allow loosening so that the orientation of the accessory can be adjusted. The fastening member 68d can only be adjusted until it is received in the first portion 76d. Further loosening is prevented by the sleeve 72d. The sleeve 72d is generally freely moveable along the fastening member 62d, limited by the fastening member 68d and the fastening member 84d. The depth of the third portion 80d can be selected to ensure that the fastening member 82d and 84d are never exposed. The fastening member 82d can be threadingly engaged with the fastening member 62d and can also be permanently fixed to the fastening member 62d, such as by adhesive, to further secure the accessory. Alternatively or in addition, epoxy can fill the indentation in the head of the fastening member 82d so that a tool cannot be inserted therein, further securing the accessory.

The height of the second fastening member 68d can be less than the first height, the height of the portion 76d. This would allow the fastening member 68d to be fully concealed by the sleeve 72d when the sleeve 72d is positioned as close as possible to the primary structure. Further, this option can be desirable when the sleeve 72d is slidable along the first fastening member 62d between the second fastening member 68d and the third fastening member 82d. Alternatively, the height of the second fastening member 68d can be substantially equal to the first height. This option can minimize the material utilized to form the sleeve 72d. The amount of material can be further reduced by selecting the height of the second fastening member 68d to be slightly greater than the first height.

The height of the security head 112d of the third fastening member 82d is less than the third height 100d. This will allow the security head 112d to be fully concealed by the sleeve 72d. The height of the security head 112d of the third fastening member 82d can be less than one-half of the third height 100d. This will increase the likelihood that the security head 112d to be fully concealed by the sleeve 72d even if the sleeve 72d is slidable along the first fastening member 62d and is raised to an uppermost position. The height of the security head 112d of the third fastening member 82d can be substantially equal to the third height 100d to reduce the material utilized for the sleeve 72d. Also, the heights can be equal if the security head 112d is at a position that is difficult for a would-be thief to reach.

The various heights can be varied in view of the relative security desired. The first height 98d can be less than the height 96d of the second fastening member 68d and the third height 100d can be substantially equal to the height of the security head 112d of the third fastening member 82d for relatively secure operating environments. The combination just described can be desirable in a relatively secure operating environment since it provides the easiest access to the fastening members. Conversely, the first height 98d can be greater than the height 96d of the second fastening member 68d and the third height 100d can be greater than the height of the security head 112d of the third fastening member 82d for less secure operating environments. The combination just described can be desirable in a relatively unsecure operating environment since it provides relatively poor access to the fastening members and would require more time and effort to remove.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A security mounting arrangement comprising:
a first fastening member being a bolt having a security head, a shaft extending along a fastener axis from said security head and with outwardly-facing threads, and an aperture defined in said shaft and having inwardly-facing threads;
a second fastening member being a nut threadingly engageable with said outwardly-facing threads of said first fastening member and having a height defined along said fastener axis and a width defined transverse to said fastener axis;
a sleeve having an aperture configured to receive said second fastening member and said shaft, said aperture of said sleeve having a first portion and a second portion and a third portion, said first portion having a first height defined along said fastener axis and a first diameter sized to receive said second fastening member, said second portion having a second height defined along said fastener axis and a second diameter defined transverse to said fastener axis and less than said first diameter and positioned adjacent to said first portion along said fastener axis, said third portion having a third height defined along said fastener axis and a third diameter defined transverse to said fastener axis and greater than said second diameter and spaced from said first portion along said fastener axis; and
a third fastening member being a bolt extendable through said aperture of said first fastening member and threadingly engageable with said inwardly-facing threads, said third fastening member having a shaft and a security head having a height defined along said fastener axis and a width defined transverse to said fastener axis, said width of said security head of said third fastening member greater than said second diameter and less than said third diameter.

2. The security mounting arrangement of claim 1 wherein said sleeve is further defined as having an outer arcuate surface in a plane containing said fastener axis.

3. The security mounting arrangement of claim 2 wherein said sleeve is further defined as having a truncated spherical outer surface.

4. The security mounting arrangement of claim 2 wherein said outer arcuate surface is further defined as elliptical.

5. The security mounting arrangement of claim 1 wherein said aperture of said sleeve further comprises a fourth portion having a fourth height defined along said fastener axis and a fourth diameter sized to receive said shaft of said third fastening member, said fourth portion positioned between said second portion and said third portion along said fastener axis, said fourth diameter less than said second diameter and less than said third diameter.

6. The security mounting arrangement of claim 1 wherein said height of said second fastening member is less than said first height.

7. The security mounting arrangement of claim 1 wherein said height of said second fastening member is substantially equal to said first height.

8. The security mounting arrangement of claim 1 wherein said height of said second fastening member is greater than said first height.

9. The security mounting arrangement of claim 1 wherein said height of said security head of said third fastening member is less than said third height.

10. The security mounting arrangement of claim 9 wherein said height of said security head of said third fastening member is less than one-half of said third height.

11. The security mounting arrangement of claim 1 wherein said height of said security head of said third fastening member is substantially equal to said third height.

12. The security mounting arrangement of claim 1 wherein said first height is less than said height of said second fastening member and said third height is greater than said height of said security head of said third fastening member.

13. The security mounting arrangement of claim 1 wherein said first height is greater than said height of said second fastening member and said third height is greater than said height of said security head of said third fastening member.

14. The security mounting arrangement of claim 1 further comprising:
a fourth fastening member being a nut threadingly engageable with said outwardly-facing threads of said third fastening member and having a height defined along said fastener axis and a width defined transverse to said fastener axis.

15. The security mounting arrangement of claim 14 wherein said height of said fourth fastening member in combination with said height of said security head of said third fastening member is less than said third height.

16. The security mounting arrangement of claim 15 wherein said width of said fourth fastening member is greater than said width of said security head of said third fastening member.

17. The security mounting arrangement of claim 15 wherein said first fastening member further comprises first and second sets of outwardly-facing and differently-sized threads, said second fastening member engaging said first set of outwardly-facing threads and said fourth fastening member engaging said second set of outwardly-facing threads.

18. The security mounting arrangement of claim 17 wherein said first set of outwardly-facing threads are positioned in said second portion of said aperture of said sleeve and said second set of outwardly-facing threads are positioned in said third portion of said aperture of said sleeve.

19. The security mounting arrangement of claim 18 wherein said aperture of said first fastening member extends below both of said first and second sets of outwardly-facing threads.

20. The security mounting arrangement of claim 1 further comprising:
a mounting bracket having a first aperture and a second aperture spaced from one another, said second aperture configured to receive configured to receive said first fastening member for interconnecting said mounting bracket to a primary structure;
a shielding bracket selectively engageable with said mounting bracket having a third aperture aligned with said first aperture when said mounting bracket and said shielding bracket are engaged with one another; and
wherein a passageway extending along an axis is defined by said first aperture and said third aperture and extends through said mounting bracket and said shielding bracket when said mounting bracket and said shielding bracket are engaged with one another, said passageway extending between a first end defined by said mounting bracket and a second end defined by said shielding bracket, said passageway having a first portion with a first diameter positioned proximate to said first end of said passageway, said passageway having a second portion with a second diameter positioned proximate to said second end of said passageway, said passageway having a third portion with a third diameter positioned between said first portion and said second portion along said axis, and said third diameter being greater than said first diameter and said second diameter.

* * * * *